(12) United States Patent
Gerber

(10) Patent No.: US 10,814,962 B2
(45) Date of Patent: Oct. 27, 2020

(54) FLOW BODY, METHOD FOR MANUFACTURING A FLOW BODY AND AIRCRAFT HAVING SUCH A FLOW BODY

(71) Applicant: Airbus Operations GmbH, Hamburg (DE)

(72) Inventor: Martin Gerber, Hamburg (DE)

(73) Assignee: AIRBUS OPERATIONS GmbH, Hamburg (DE)

(*) Notice: Subject to any disclaimer, the term of this patent is extended or adjusted under 35 U.S.C. 154(b) by 304 days.

(21) Appl. No.: 14/574,876

(22) Filed: Dec. 18, 2014

(65) Prior Publication Data
US 2015/0183513 A1 Jul. 2, 2015

(30) Foreign Application Priority Data
Dec. 18, 2013 (EP) .................................. 13198174

(51) Int. Cl.
*B64C 21/06* (2006.01)
*B64C 5/06* (2006.01)
(Continued)

(52) U.S. Cl.
CPC ............ *B64C 21/06* (2013.01); *B23K 1/0008* (2013.01); *B23K 1/20* (2013.01); *B29C 65/76* (2013.01);
(Continued)

(58) Field of Classification Search
CPC .......... B64C 3/28; B64C 21/02; B64C 21/06; B64C 2230/04; B64C 2230/22; B64C 21/00; B64C 21/025; B64C 2230/08
See application file for complete search history.

(56) References Cited

U.S. PATENT DOCUMENTS 2,613,893 A * 10/1952 Young ..................... B64C 3/28
244/123.1
4,813,631 A * 3/1989 Gratzer ................... B64C 9/146
244/209
(Continued)

FOREIGN PATENT DOCUMENTS

| EP | 2208669 A2 | 7/2010 |
| EP | 2886452 A1 | 6/2015 |
| WO | 2005063565 A1 | 7/2005 |

OTHER PUBLICATIONS

European Patent Office, Extended European Search Report for Application No. EP13198174.8 dated May 12, 2014.
(Continued)

*Primary Examiner* — Christopher D Hutchens
(74) *Attorney, Agent, or Firm* — Nixon & Vanderhye P.C.

(57) ABSTRACT

An flow body comprises a curved suction skin having a first perforation, a leading edge and two skin sections extending therefrom, wherein each skin section has an outer end facing away from the leading edge, an interior suction duct having a second perforation and extending through an inside of the curved suction skin in a distance from the leading edge, and two sidewall members, connected to the outer ends, wherein the sidewall members are made of a composite material. The suction skin comprises a profiled contour shape, which determines a pressure distribution over at least one of the two skin sections when air flows over the curved suction skin, wherein the pressure distribution comprises a stagnation point, a suction peak and a subsequent local pressure maximum downstream of the suction peak, wherein the first perforation extends from a stagnation point on the suction skin to the local pressure maximum.

14 Claims, 6 Drawing Sheets

(51) Int. Cl.
  *B23K 1/00* (2006.01)
  *B23K 1/20* (2006.01)
  *B29C 65/76* (2006.01)
  *B64C 5/02* (2006.01)

(52) U.S. Cl.
  CPC .................. *B64C 5/02* (2013.01); *B64C 5/06* (2013.01); *B64C 2230/04* (2013.01); *B64C 2230/22* (2013.01); *Y02T 50/166* (2013.01); *Y10T 29/49826* (2015.01)

(56) References Cited

U.S. PATENT DOCUMENTS

| | | | | |
|---|---|---|---|---|
| 5,263,667 A | * | 11/1993 | Horstman | B64C 21/06 244/130 |
| 5,362,347 A | * | 11/1994 | Domine | B29C 66/72 156/212 |
| 5,807,454 A | * | 9/1998 | Kawabe | B29C 70/443 156/214 |
| 5,899,416 A | * | 5/1999 | Meister | B64C 21/06 244/207 |
| 7,757,994 B2 | | 7/2010 | Schrauf | |
| 7,866,609 B2 | * | 1/2011 | Parikh | B64C 21/06 244/209 |
| 2002/0011540 A1 | * | 1/2002 | De Castro Nodal | B64C 3/20 244/45 R |
| 2007/0221788 A1 | | 9/2007 | Meister | |
| 2009/0020653 A1 | | 1/2009 | Schrauf | |
| 2010/0226778 A1 | * | 9/2010 | Wallis | B21D 26/055 416/223 A |
| 2011/0049298 A1 | * | 3/2011 | Makela; Juha | B64C 3/28 244/123.14 |
| 2013/0062473 A1 | * | 3/2013 | Golling | B64C 21/025 244/208 |
| 2013/0270390 A1 | | 10/2013 | Schrauf et al. | |
| 2014/0117166 A1 | * | 5/2014 | Campbell, Jr. | B64C 23/065 244/199.4 |
| 2015/0083258 A1 | * | 3/2015 | Rupp | F15D 1/008 137/803 |

OTHER PUBLICATIONS

European Patent Office, Extended European Search Report for Application No. EP 14198674.5 dated Jun. 9, 2015.
European Patent Office, European Office Action for Application No. 14198674.5 dated Feb. 9, 2017.

* cited by examiner

FLOW BODY, METHOD FOR MANUFACTURING A FLOW BODY AND AIRCRAFT HAVING SUCH A FLOW BODY

CROSS-REFERENCE TO RELATED APPLICATION

This application claims priority to European Patent Application No. 13198174, filed Dec. 18 2013, which is incorporated herein by reference in its entirety.

TECHNICAL FIELD

The embodiment described herein relates to a flow body having a perforated outer skin at least in some regions. The embodiment further relates to a method for manufacturing such a flow body and an aircraft having such a flow body.

BACKGROUND

The efficiency of an aircraft depends on a plurality of different factors. A main factor is the aerodynamic drag, which is to be reduced to a minimum. For example, it is an aim to laminarize the flow around aerodynamic surfaces of an aircraft, such as a tail plane. For this purpose it is known to selectively suck off air from the boundary layer at leading edges of the tail plane, which normally face turbulent flow. This allows laminarized air flow to a certain extent. This concept is known as Hybrid Laminar Flow Control (HLFC), which permits a shift in the transition between turbulent and laminar flow through suction on the first 15 to 20% of the chord.

In a vertical or horizontal tail plane the, suction of air may be accomplished through a double skin arrangement, in which a second skin is arranged downstream of a leading edge skin of the respective tail plane component, such that a suction chamber is created between the leading edge skin and the second skin. In another known embodiment, a triangular suction chamber is created between the leading edge skin and a wall arranged at a distance from the leading edge skin, with sidewalls extending from the wall to a common edge on the leading edge.

EP 1 699 686 A1 and US 2009 0020653 A1 show a device for providing a suction of a boundary layer at the surface of an aircraft, wherein the sucked off air is supplied to an environmental control system.

US 20130270390 A1 shows an aircraft with an air sucking component with an outer surface that is perforated at least in some regions, and a suction profile body, which forms a local bulge in the outer skin and comprises a suction opening connected to the air sucking fuselage component for passively sucking off air.

In addition, other objects, desirable features and characteristics will become apparent from the subsequent summary and detailed description, and the appended claims, taken in conjunction with the accompanying drawings and this background.

SUMMARY

Current suction box structures are equipped with span wise stringers and are manufactured mainly from titanium for achieving a high durability against environmental impacts, e.g. corrosion or erosion. This leads to a complex and expensive manufacturing process for producing such a hollow structure and for integrating further functions, such as de-icing or anti-icing systems. Junction technologies for the outer perforated skin with stringers and the inner skin are based on welding, riveting or brazing and do not provide a proper design for creating hollow structures.

It is therefore an object of an embodiment to provide a flow body having a perforated outer skin, which flow body leads to clearly reduced manufacturing costs through a smaller number of necessary stringers, while still maintaining a dimensionally stable shape and an improved ability to integrate further functions, such as icing systems.

The object is met by a flow body having the features of independent claim 1. Advantageous improvements and embodiments may be derived from the sub-claims and the following description.

A flow body is proposed, the flow body comprising a curved suction skin having a first perforation, a leading edge and two skin sections extending therefrom, wherein each skin section has an outer end facing away from the leading edge, an interior suction duct having a second perforation and extending through an inside of the curved suction skin in a distance from the leading edge, and two sidewall members connected to the outer ends of the skin sections. The sidewall members are made of a composite material. The curved suction skin comprises a profiled contour shape, which determines a pressure distribution over at least one of the two skin sections when air flows over the curved suction skin, wherein the pressure distribution comprises a stagnation point, a suction peak and a local pressure maximum downstream of the suction peak. Still further, the first perforation extends from the stagnation point to the local pressure maximum.

The flow body according to the embodiment may be a component of a tail plane assembly, i.e. a vertical tail plane or a horizontal tail plane. The curved suction skin constitutes a nose region of this part and may be connected through the sidewall members to a front spar of the component. Consequently, the curved suction skin and more particularly a region around the leading edge comprises a shape that allows the suction skin to be used as a leading edge of the respective aircraft component. The curvature of the suction skin may preferably be identical to the curvature of a usual nose region of the aircraft component. In particular, the desired pressure distribution should occur in cruise flight conditions.

Providing the profiled contour shape may be realized by slightly increasing a local nose radius in comparison with a common nose radius of a similar (common) aircraft component, which is not designed in accordance with the embodiment. However, a part following on from the sidewall members to a trailing edge of the respective aircraft component may be maintained, such that the increased nose radius runs into the remaining contour downstream of the sidewall members. This leads to the creation of a suction peak and a local maximum downstream of the suction peak. From this local maximum on the so-called Tollmien-Schlichting instability dominates the flow characteristics instead of transverse flow instability. The boundary layer flow is accelerated through the shape of the flow body and thereby damps the Tollmien-Schlichting instability. Hence, sucking of air downstream of this local maximum is not necessary.

The profiled contour shape may be determined through an analytic process, through experiments or through a simulation. For example, in wind tunnel experiments, several contour shapes may be tested, until a desired pressure distribution is accomplished. For saving costs, this may also be conducted in a simulation environment, such as in a CFD simulation on a computer.

The raw material for producing the suction skin may be a sheet metal plate with a flat and preferably rectangular shape, which is bent to the desired shape. Depending on the type or the desired installation position of the flow body, the shape of the suction skin may be symmetrical or not. Preferably, the leading edge comprises the largest curvature.

The first perforation may be introduced after forming the suction skin to the desired shape. The first perforation preferably is a micro perforation and comprises a plurality of first perforation holes arranged in a predetermined pattern with at least one predetermined spacing between the holes, preferably depending on determined local air flows necessary for laminarizing the flow.

The suction skin may preferably be manufactured from titanium, exemplarily through using a super-plastic-forming (SPF) process. For this process, a sheet metal work piece of titanium with a fine grain size is heated to a temperature of around 900° C. In this state the material is formable through processes that are usually used on plastic materials, such as: thermoforming, blow forming, vacuum forming and deep drawing. After the forming process, the suction skin does not suffer from spring back or residual stresses.

The sidewall members made from a composite material extend the metallic section of the air sucking fuselage component. Due to the advantageous pressure distribution, the size of the suction skin may be reduced to a minimum. Hence, the suction skin is extended to a common size of e.g. a leading edge section of an aircraft component through the use of extremely lightweight components in the form of the sidewall members. The resulting flow body has a low weight and an outstanding structural stability.

The composite material, which is used for the sidewall members, may include all types of material compositions. For example, fiber-reinforced plastic materials provide exceptional rigidity and in particular tensile strength. These materials may include carbon fiber reinforced plastics (CFRP), glass fiber reinforced plastics, and (GFRP) and aramid fiber reinforced plastics. Also, fiber metal laminates such as Glare and other hybrid materials comprising plastic and metal are suitable.

For the purpose of connecting the suction skin and the sidewall members, the suction skin exemplarily comprises inwardly oriented indentations at the outer edges for receiving the sidewall members with correspondingly shaped indentations, protrusions, connecting strips, flanges or the like. In this regard, a receiving surface of the indentations are shifted towards the interior of the suction skin, i.e. into the space between the outer edges and the nose region.

Preferably, the composite sidewalls have a front spar connection region, which are formed so as to connect with a front spar of the flow body, such as a front spar of a vertical tail plane, which is usually located a distance from the leading edge of the vertical tail plane. The front spar connection region may comprise a strip-like extension, which may be brought into contact with a corresponding connection region of the front spar.

According to a further embodiment, the first perforation extends from the stagnation point along the curved suction skin up to 8%-15% of a chord length and in particular 10% of the chord length of the flow body. Due to the advantageous design of the flow body and especially the curved suction skin, the extension of the perforated region can be realized rather small, such that material and manufacturing costs may be reduced.

In a preferred embodiment, the side wall members are made of a sandwich material having at least one core layer enclosed between cover layers. As a result, the sidewall members provide a great dimensional stability, yet a distinctly low weight. The core may be a honeycomb core made from a fibre reinforced plastic material, which is enclosed between two parallel cover layers.

If the suction skin is made using an SPF process, a plurality of stiffening components on the inside may be integrated through the SPF process. Hence, additional bonding processes do not need to be conducted.

In an advantageous embodiment, the first perforation comprises a plurality of boreholes with a diameter of 30 µm or less. Exemplarily, these may be produced through a laser drilling process. This diameter is clearly lower than the diameter of common micro perforation boreholes in common air sucking fuselage components. Due to the use of a single suction skin and the elimination of the double wall arrangement in the fuselage component according to the embodiment, only the single suction skin is responsible for providing a sufficient flow resistance through the perforation. The use of this small diameter and preferably a variable spacing between the perforation holes permits the introduction of excessive airflows into the inside of the air sucking fuselage component to be prevented.

In a further embodiment, the first perforation comprises first perforation boreholes of the same diameter, wherein the boreholes are arranged in a regular and/or varying distribution, i.e. having a non-uniform spacing, over the suction skin. Through the use of a single diameter and a regular distribution, the manufacturing costs may be reduced. Also, due to the design of the fuselage component according to the embodiment, a less span wise extension of a perforated area is required. Through the design of the suction skin according to the above mentioned features, the perforated area and therefore the suction skin may be rather slim or small, which leads to a reduction in manufacturing costs.

In this regard, it is mentioned that the first perforation preferably is designed for reaching higher suction velocities at the leading edge region of the flow body, which necessitates a high pressure loss over the suction skin. This means that smaller holes and/or a lower density of holes may be arranged in the leading edge region. However, further downstream, lower suction velocities may be required, which necessitate a lower pressure loss over the suction skin. This means that larger holes and/or a higher density of holes is preferred further downstream. In general, the required pressure loss may be proportional to the square of the desired suction velocity.

In a still further advantageous embodiment, the interior suction duct is constituted by an interior wall arrangement fixed to an inside of the curved suction skin, the interior wall arrangement comprising a first interior sidewall connected to the first end of the suction skin, a second interior sidewall connected to the second end of the suction skin, a first spar member connected to the first and second interior sidewalls at the first and second ends of the suction skin and a second spar member connected to the first and second interior sidewalls at an end opposite to the first and second ends of the suction skin, such that a closed, quadrilateral cross-sectional suction duct surface is created by the first spar member, the first interior sidewall, the second spar member and the second interior sidewall member. The quadrilateral cross-sectional suction duct surface extends a distance along the nose region. Through the use of the first spar member at the outer edges of the suction skin, a suction chamber is created in a section between the first spar member and the suction skin in the region of the leading edge. The metallic part is thereby a self-contained unit, which is attachable to any component without requiring an enhancement of structural stability. It goes without saying that at least one of the first interior sidewall member, the second interior sidewall member and the second spar member comprises the second perforation in order to allow air to enter the suction duct. The first and second spar members are stiffening components, which may be manufactured from the same material as the suction skin, e.g. titanium. However, the first spar member may also comprise a composite material, such as fibre reinforced plastics or a fibre metal laminate or any other material mentioned in relation to the sidewall members. Preferably, the first spar member is connected to the outer edges in an airtight manner, such that an airtight suction chamber is created between the first spar member and the nose region.

Preferably, indentations for connecting the suction skin and the sidewall members, as explained above, are each arranged in a position where the first spar member is fastened. Thereby, the second spar and the composite sidewalls may be fastened by using the same fasteners or the same fastener positions. Joining the various components may be accomplished at once and the suction skin, the second spar and the connection regions of the sidewalls may be adjusted to an appropriate load introduction. Through the use of the same fasteners or the same fastener positions, a reduced weight may be accomplished.

The flow body is stiffened by the two spar members, which create a framework with the two interior sidewalls. The frame work leads to a superior stability and a self-contained metallic section of the fuselage component. Due to this stability a simple reduction of the span wise extension of the suction region is possible.

For providing a support of the second spar member and the ends of the two interior sidewalls facing the nose region, stringers may be arranged between the interior sidewalls and the suction skin. The stringers may extend continuously along the respective interior wall member or spar member or may be interrupted. The framework allows a distinct rigidity of the nose region, as air loads and impulses from foreign objects is forwarded into the interior sidewalls, such that multiple load paths are present.

In an exemplary embodiment, a plurality of distanced ribs is distributed along the inside of the suction skin, wherein the ribs are arranged at a distance to the leading edge. The ribs each comprise a cut-out through which a tubular suction duct extends and the ribs are arranged between the first spar member and the leading edge for providing a determined structural stability of a region around the leading edge, i.e. a nose region, and support for the tubular suction duct. Hence, the space between the first spar and the nose region creates a suction chamber, out of which the tubular suction ducts extracts air. This provides a constant and determinable flow resistance throughout the flow body. Also, connecting the tubular suction duct may easily be accomplished through a flange, a bellow, a sealed fluid port or any other suitable means.

In a preferred embodiment, the ribs are brazed to the suction skin. This avoids a distortion, unevenness or waviness of the suction skin caused by welding, which is also known as the "Zeppelin effect".

Still further, the flow body may also comprise at least one and in particular two inner spars, which delimit the interior suction duct. It goes without saying that this flow body may be used for active suction and for passive suction methods.

In accordance with a further embodiment, there is provided a method for manufacturing a flow body as explained above. The method comprises forming a suction skin to a profiled contour shape having a leading edge and two skin sections extending therefrom, wherein each skin section has an outer end facing away from the leading edge, such that the profiled contour shape of the suction skin determines a pressure distribution over at least one of the two skin sections when air flows over the curved suction skin, which pressure distribution comprises a stagnation point, a suction peak and a local maximum downstream of the suction peak, creating a first perforation extending from the stagnation point to the local maximum, providing an interior suction duct having a second perforation and extending through an inside of the curved suction skin in a distance from the leading edge, and connecting two sidewall members to the outer ends of the skin sections, wherein the sidewall members are made of a composite material.

As mentioned above, the method creating the first perforation comprises creating first perforation holes from the stagnation point along the curved suction skin up to 8%-15% of a chord length and in particular 10% of the chord length of the flow body. Further, forming the curved suction skin may comprise a Super Plastic Forming (SPF) process of a titanium work piece. Still further, forming the curved suction skin may also comprise integrating a plurality of stiffening components at the inside of the suction skin through the SPF process and may comprise brazing ribs to the inside of the suction skin.

Finally, the embodiment relates to an aircraft having such a flow body.

BRIEF DESCRIPTION OF THE DRAWINGS

Further characteristics, advantages and application options of the present embodiments described herein are disclosed in the following description taken in conjunction with the figures. All the described and/or illustrated characteristics per se and in any combination form the subject of the embodiments, even irrespective of their composition in the individual claims or their interrelationships. Furthermore, identical or similar components in the figures have the same reference characters.

DETAILED DESCRIPTION

The following detailed description is merely exemplary in nature and is not intended to limit the embodiments or the application and uses of the embodiments. Furthermore, there is no intention to be bound by any theory presented in the proceeding background of the embodiments or the following detailed description.

Figure 1A:
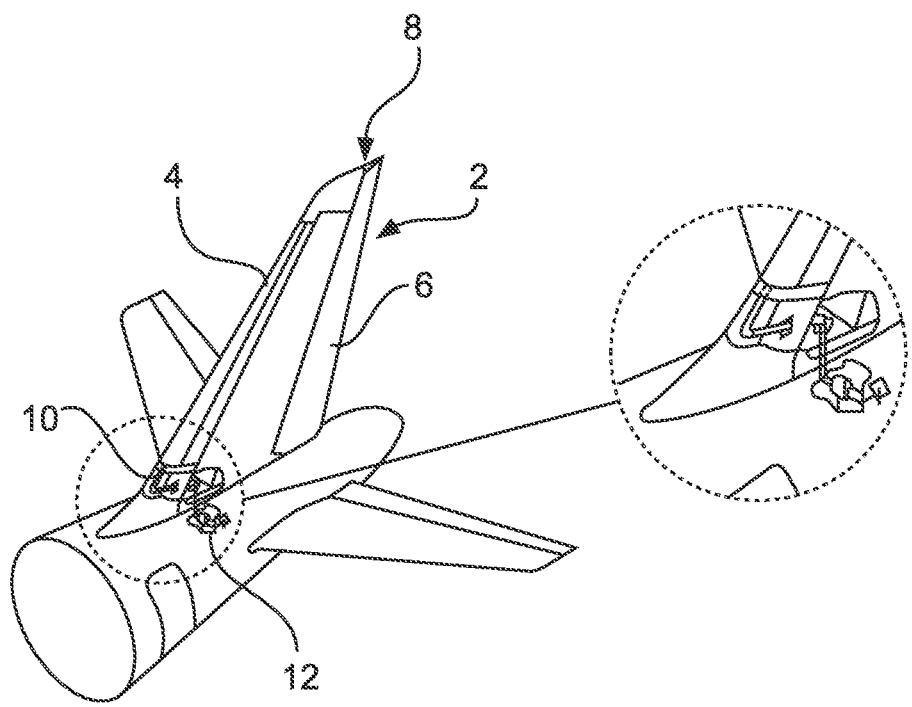
FIGS. 1A and 1B show a vertical tail plane having an air sucking fuselage component in an isometric view.
Figure 1B:
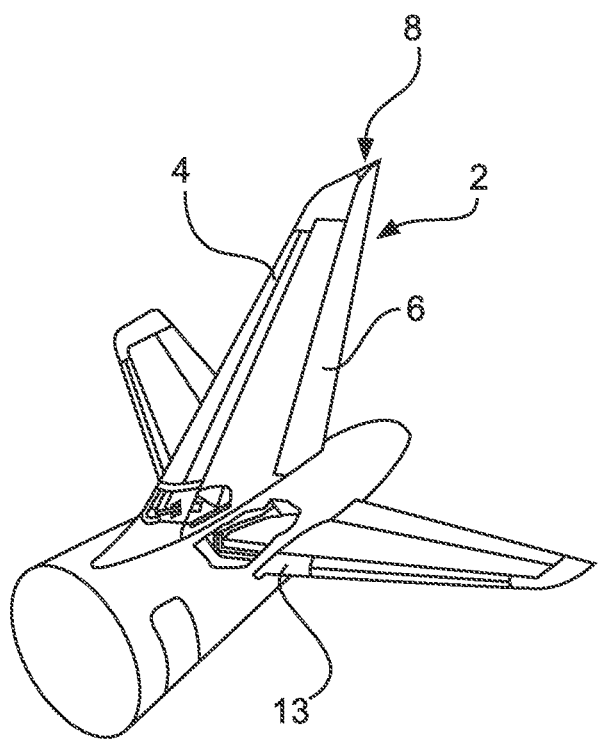

FIG. 1 shows a flow body according to an embodiment in form of a tail plane assembly having an air sucking nose component 4. The flow body may be a component of a vertical tail plane 2 as shown or a horizontal tail plane 13. The vertical tail plane 2 provides a directional stability around the vertical axis, i.e. the z-axis in an aircraft-fixed coordinate system, reduces aerodynamic side slip and allows to control the aircraft's yaw movement by a rudder 6 movably arranged at a trailing edge 8 of the vertical tail plane 2.

The vertical tail plane 2 is fully exposed to an airflow caused by the motion of the aircraft, such that the drag of the vertical tail plane 2 should be decreased to a minimum. As the overall dimensions of the vertical tail plane 2 mainly depend on the stabilizing function and the required structural stability, the drag cannot be reduced through decreasing the size of the vertical tail plane 2. As explained further above, a significant drag reduction may be achieved through selectively sucking air from a boundary flow layer of a nose region of the vertical tail plane 2, such that the flow is as laminar as possible.

Therefore, the air sucking nose component 4 is at least partially gas permeable through a micro perforation. The air sucking nose component 4 is may be coupled to an air sucking line 10, a fan 12 and/or any other device that is able to provide a clearly lower pressure than the dynamic pressure in the boundary layer of the air sucking nose component 4. This may also be accomplished through passive means, such as through exploiting a gas flow along an opening which experiences a suction force due to the Bernoulli effect.

Figure 2A:
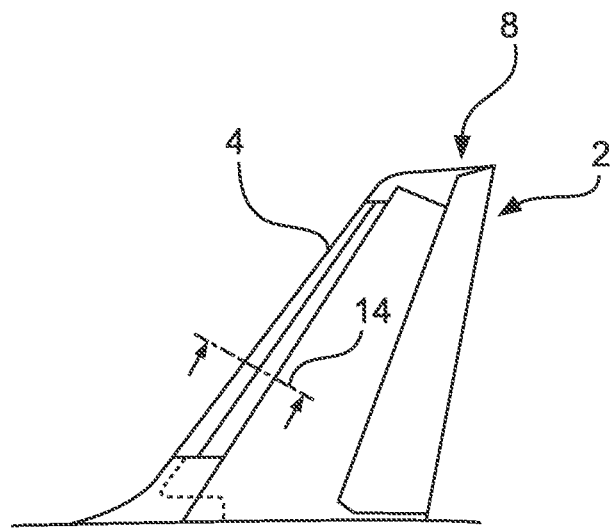
FIGS. 2A and 2B show the vertical tail plane having an air sucking fuselage component in a lateral view and a sectional view.
Figure 2B:
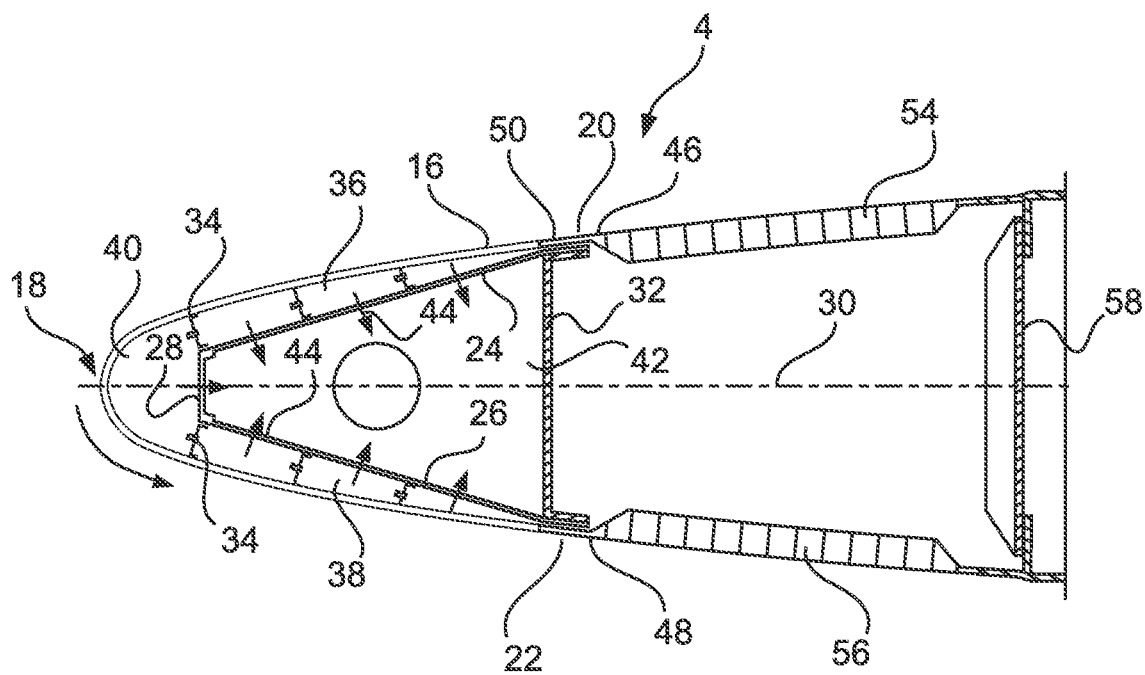

As shown in further FIGS. 2A and 2B, a flow body according to an embodiment may be created having a combination of a self-contained metal structure with a reduced span wise extension and a composite structure connected thereto, altogether leading to a lower weight and reduced manufacturing costs. More particularly, FIG. 2A shows the flow body in form of the vertical tail plane 2 with the air sucking nose component 4 in a lateral view. Here, a sectional plane 14 is indicated by the letter A. The sectional view onto this sectional plane 14 is shown in FIG. 2B.

Here, the general setup of the flow body is shown in detail.

The flow body 2 comprises a micro perforated suction skin 16, which is curved in a way that a leading edge 18 is created, wherein a small region around the leading edge 18 will be named "nose region" in the following. The suction skin 16 furthermore comprises two opposing ends 20 and 22 facing away from the leading edge 18. In the following, an upper end 20 (in the drawing plane) will be named "first end", while a lower end 22 will be named "second end 22". From the first end 20, a first interior sidewall 24 extends into the direction of the leading edge 18, wherein the distance between the first interior sidewall 24 and the suction skin 16 constantly increases. In a clear distance to the leading edge 18, the first interior sidewall 24 ends. In the same way, a second interior sidewall 26 extends from the second end 22 of the suction skin into the direction of the leading edge 18.

The two interior sidewalls 24 and 26 are connected by a second spar member 28 having a perforation 105, which second spar member 28 is arranged vertically relative to an extension direction 30 of the profile chord of the flow body 2. Further, the first end 20 and the second end 22 are connected through a first spar member 32. The intermediate space between the second spar member 28 and the suction skin 16 is closed through stringers 34.

Consequently, four closed sections within the suction skin 16 are created. The space between the first inner wall 24 and the suction skin 16, closed by a span wise stringer 34, is named first suction chamber 36. At the opposite side, a second suction chamber 38 is created between the second interior sidewall 26 and the suction skin 16. Between the nose region and the second spar member 28, closed by auxiliary spars 34, a third suction chamber 40 is created. Enclosed by the first, the second and the third suction chamber 36, 38 and 40 and the second spar member 28, a suction duct 42 is created.

The suction chambers 36, 38 and 40 are coupled with the central duct 42 through interior perforations 44 having a diameter or opening dimensions, which clearly increase the opening diameters of micro perforation in the suction skin 16. Hence, through applying a suction pressure at the central duct 42, air is sucked over the three suction chambers 36, 38 and 40 through the micro porous opening in the suction skin 16 into the suction duct 42.

In a region at the first end 20 and the second end 22, the suction skin 16 comprises inwardly directed indentations 46 and 48, which allow receiving of connection regions 50 and 52 of composite sidewall members 54 and 56.

The composite sidewall members 54 and 56 further extend the air sucking nose component 4 and may allow a connection on a front spar 58 of the flow body/vertical tail plane 2. The part extending from the nose region to the first spar member 32 is made from a metallic material, and preferably is completely self-contained. Hence, for the purpose of saving weight, the sidewall members 54 and 56 are preferably made from a sandwich structure. The use of stringers, spars or other stiffening elements thereby concentrate on the metallic part, resulting in a reduction of the overall weight.

Preferably, the first spar member 32 is fastened to the suction skin 16 in a region that also includes the first end 20 and the second end 22, such that the connections to the composite sidewall members 54 and 56 may be combined with the connection to the front spar 58. Fastening material may thereby be reduced.

Figure 3A:
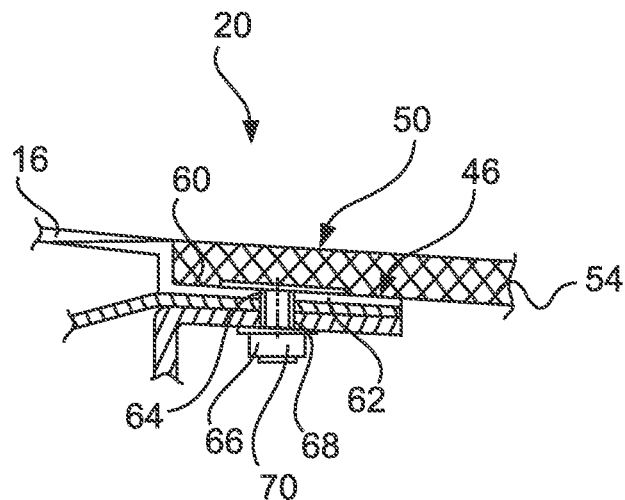
FIGS. 3A, 3B and 3C show connections/joints of parts of an air sucking component.
Figure 3B:
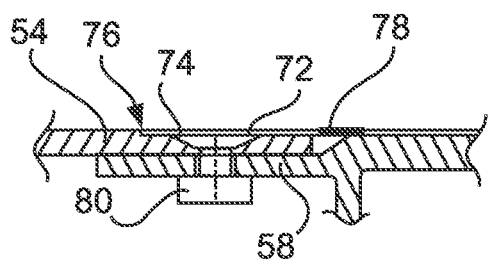
Figure 3C:
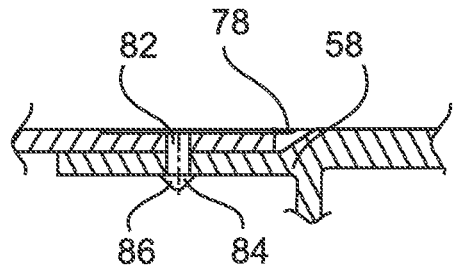

FIG. 3A shows a possible detail of a joint in the region around the first end 20. Here, the indentation 46 is created through the use of an angular sheet metal, which may be welded to the remaining part of the suction skin 16, e.g. through diffusion welding. The indentation 46 may comprise a receiving surface 60, which is milled with a precision-milling method to provide exact measures.

The connection region 50 of the first composite sidewall member 54 may comprise a jointed stay bolt 62, which may preferably be integrated into the composite material of the first sidewall member 54, e.g. between two subsequent fiber, metal or plastic layers. The bolt 62 comprises a large contact surface, which allows to easily integrate it into the composite sidewall member 54 during the manufacturing process. The contact surface may be disk- or stripe-shaped.

The bolt 62 may extend through a first hole 64 created in the indentation/receiving surface 60, extend through a second hole 66 of the first interior sidewall 24 and, furthermore, extend through a third hole 68 of the second spar 32. Afterwards, a nut 70 is screwed onto the bolt 62. Consequently, through fastening the nut 70, all of the components are fastened together. It goes without saying, that an appropriate amount of sealing material should be applied before fastening the nut 70 as well as providing the three boreholes 64, 66 and 68 together at once and debur the boreholes 64, 66 and 68.

A connection of the composite sidewalls 54 and 56 to the front spar 58 may be accomplished through a bolt 72 integrated into the sidewall member 54, e.g. in a cone-shaped borehole 74, for creating an even, plane surface. The composite sidewall member 54 may further comprise an indentation 76, which provides a sealing lip 78 onto the composite sidewall 54 and the bolt 72. The sealing lip may be glued to this composition.

The front spar 58 of the vertical tail plane 2 may then be fastened to the composite sidewall member 54 through a nut 80, which is fastened onto the bolt 72.

In an alternative embodiment or additionally to the use of bolts 72, fastening elements 82 having a flexible element 84 with an undercut 86 may be used for clamping/clicking/ratching the composite sidewall member 54 onto the front spar 58.

Figure 4:
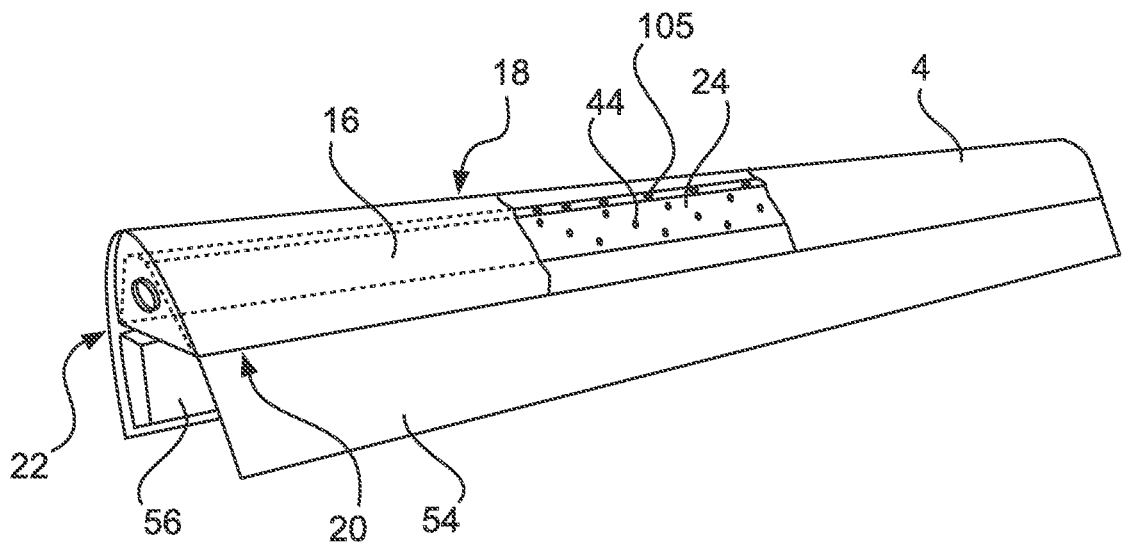
FIG. 4 shows an isometric, partially sectional view of the air sucking fuselage component.

FIG. 4 shows the air sucking nose component 4 of the flow body according to the embodiment in an isometric view. Here, the leading edge 18, the first end 20 and the second end 22 limit the metallic structure, while composite sidewalls 54 and 56 follow on. In a partial sectional view, the first interior sidewall 24 with a number of perforations 44 is demonstrated. These inner perforations 44 comprise a diameter clearly exceeding the diameter of the micro porous suction skin 16.

Figure 5:
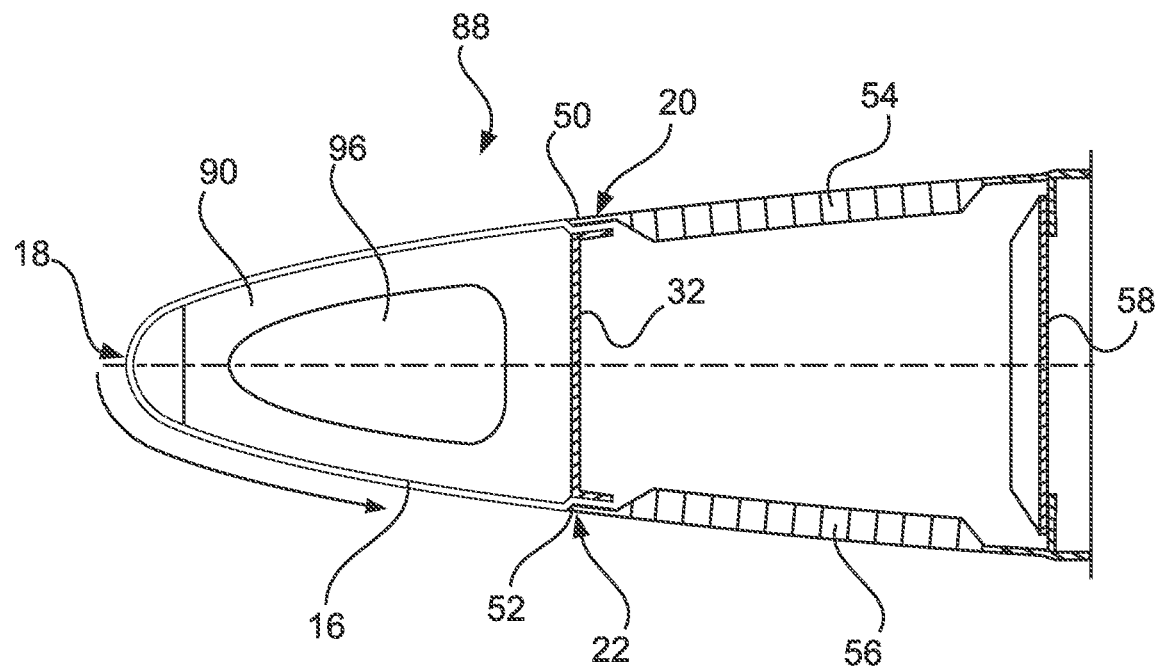
FIG. 5 shows a further design of the air sucking fuselage component in a sectional view.

FIG. 5 shows another exemplary embodiment of a flow body 88. Here, the suction skin 16 is equipped with a plurality of ribs 90, which are distanced to each other and extend between the first spar member 32 and the leading edge 18 of the suction skin 16. In this exemplary embodiment, the ribs 90 are brazed to the suction skin 16.

Figure 6:
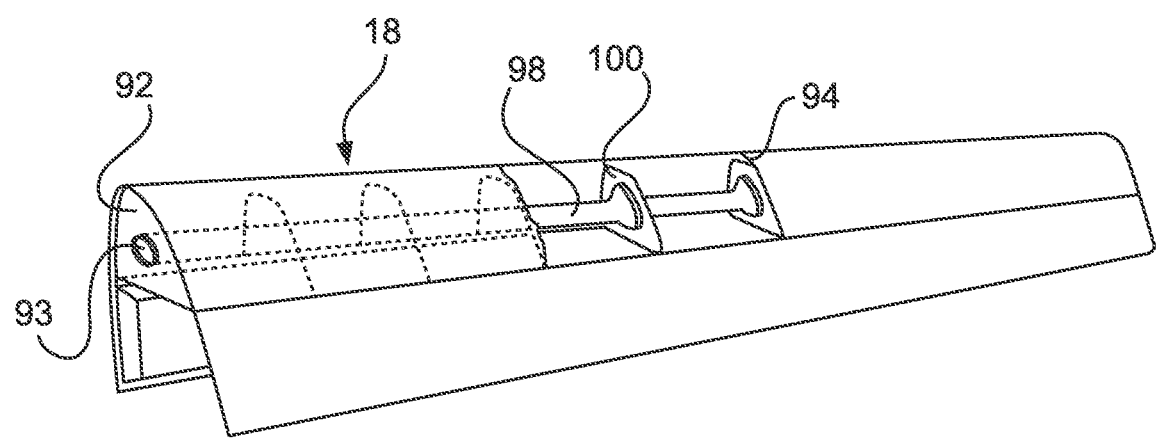
FIG. 6 shows an isometric, partially sectional view of the air sucking fuselage component of FIG. 5.

As clearly visible from FIG. 6, only outer ribs 92 and 94 extend completely to the nose region 18, while all intermediate ribs 90 located between the outer ribs 92 and 94 leave a gap, i.e. a certain distance, to the nose region 18. Exemplarily, outer rib 92 comprises a flange 93 for connecting the suction duct 98 to a suction line.

Each of the ribs 90 has a central cut-out 96, which allows to lead a tubular suction duct 98 through the flow body 88. The space between the first spar member 32 and a nose region around the leading edge 18 constitutes a suction chamber, from which air is drawn off through the tubular suction duct 98. For this purpose, the tubular suction duct 98 has a second perforation with boreholes having a diameter, which clearly exceeds the diameter of boreholes of the first perforation in the suction skin 16.

The tubular suction duct 98 has at least one scoop, hood or protrusion 100, which connects to a central cut-out 96 of a rib 90 in order to support the tubular suction duct 98.

The ribs 90 preferably extend vertical to the suction skin (16), while end ribs preferably extend parallel to the direction of flight, i.e. parallel to the direction of air flowing onto the flow body.

Figure 7:
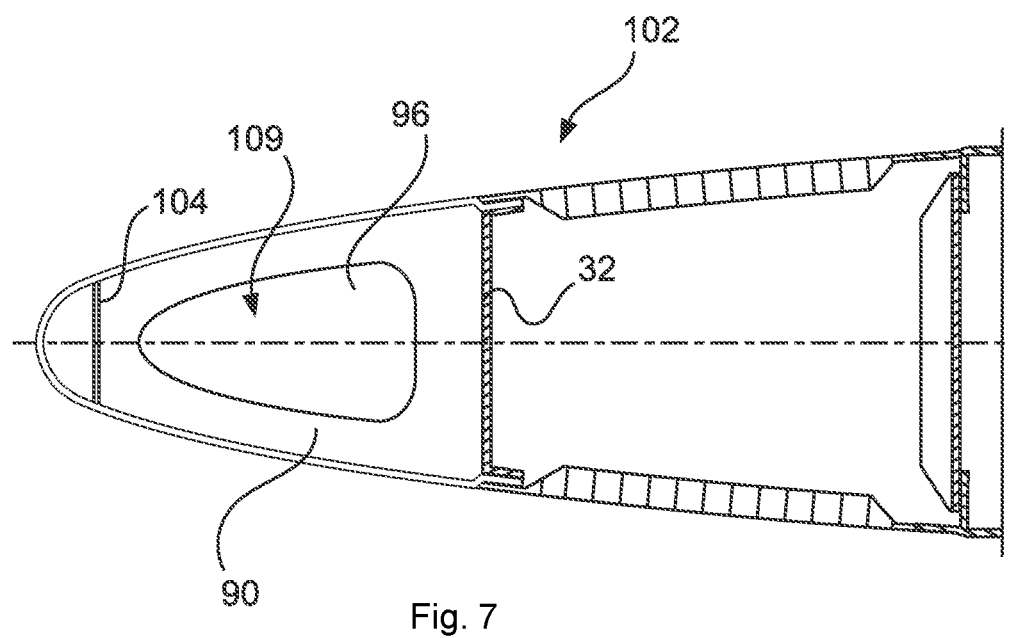
FIG. 7 shows a still further design of an air sucking fuselage component in a sectional view.

FIG. 7 shows a still further exemplary embodiment of a flow body 102 which differs from the flow body 88 of FIG. 5 through the lack of the tubular suction duct. However, due to the use of a second spar member in front of the ribs 90, an interior suction duct 109 is constituted by the first spar member 32, the second spar member 104 and the suction skin 16 there between.

Figure 8:
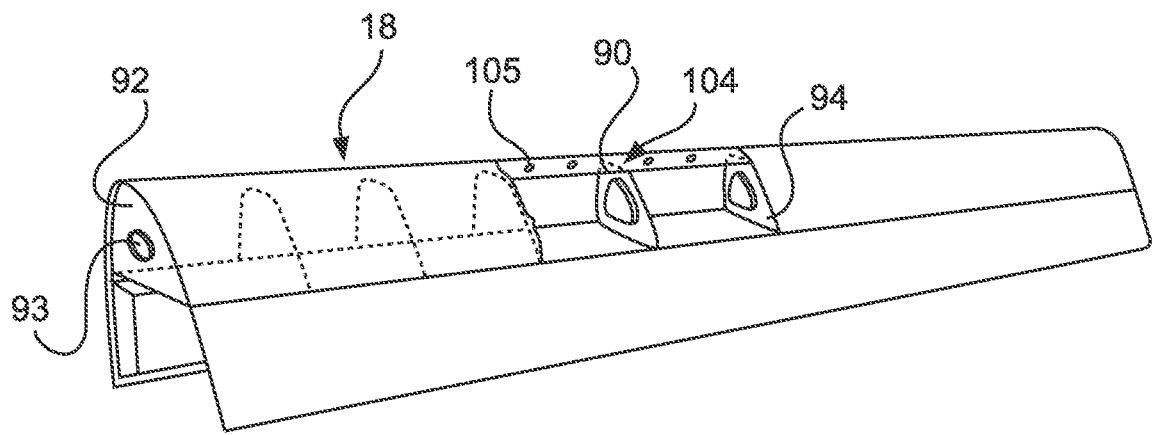
FIG. 8 shows an isometric, partially sectional view of the air sucking fuselage component of FIG. 7.

FIG. 8 shows, just like FIG. 6, that the outer ribs 92 and 94 completely extend to the leading edge 18, while all intermediate ribs 90 located between the outer ribs 92 and 94 leave a gap, i.e. a certain distance, to the leading edge 18. All ribs 90 have a central cut-out 96, which allows air to be sucked through all perforation holes along the leading edge 18. It goes without saying that the second spar member 104 comprises a second perforation 105 for allowing air to pass through it.

Figure 9:
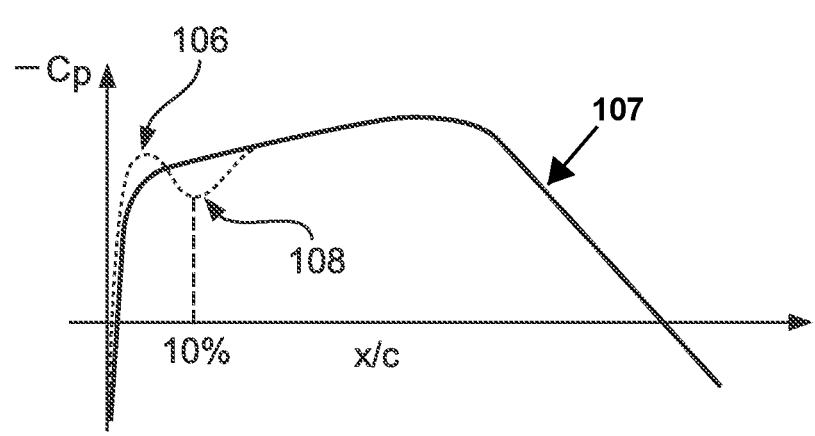
FIG. 9 shows a pressure distribution of a fuselage part comprising an air sucking fuselage component

FIG. 9 demonstrates a pressure distribution along the profile of the flow body, e.g. the vertical tail plane. As usual, a pressure coefficient $c_p$, which is the difference between local static pressure and free stream static pressure, non-dimensionalized by the free stream dynamic pressure, is shown over the non-dimensionalized relative length of the chord (c) of the flow body (x/c), wherein cp is plotted upside down, i.e. negative (suction) $c_p$ values are higher in the plot than positive $c_p$ values. The suction takes place preferably at the first 10% of the length of the chord of the vertical tail plane. Due to the shape of the vertical tail plane, a first suction peak 106 is created, which is followed by a local maximum 108 of the pressure distribution, i.e. a small region in the plot of FIG. 9 where the plot is clearly pushed to the x-axis. While the solid curve 107 shows a pressure distribution of an exemplarily chosen vertical tail plane according to the prior art, the dashed lines having the suction peak 106 and the local maximum demonstrates the changes in the pressure distribution due to a feasible redesign.

Figure 10:
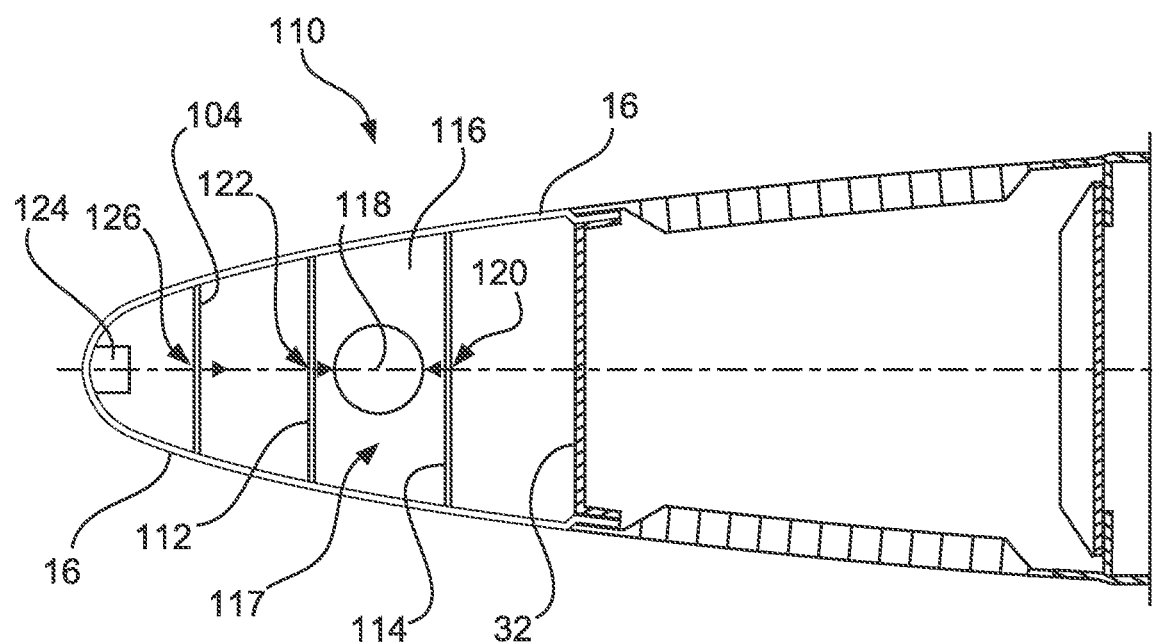
FIG. 10 shows a further exemplary embodiment of a modified flow body.

Finally, FIG. 10 shows a still further exemplary embodiment of a flow body 110, which is a modification of e.g. the flow body 102 of FIG. 7 and comprises the first spar member 32, the second spar member 104 and two inner spar members 112 and 114, which are arranged at a distance to each other as well as to the first spar member 32 and the second spar member 104. However, the ribs 90 as shown in FIG. 7 may be replaced by much smaller ribs 116, which extend between the inner spars 112 and 114 and comprise a hole 118 for leading through a duct or for constituting a flange for connecting a suction line. In the latter case, the intermediate space between the inner flanges 112 and 114 would constitute the suction duct 117.

In each of the intermediate space between the second spar member 104 and the forward inner spar 112, the intermediate space between the inner spars 112 and 114 as well as the intermediate space between the rearward inner spar 114 and the first spar member 32, perforation holes may be present in the suction skin 16. Resultantly, three sections of perforations holes may be created.

All the forward and the rear intermediate spaces may then be in fluid connection with the suction duct 117 through connection holes 120 and 122 as second perforations. This allows the suction holes arranged above, downstream or upstream of the suction duct 117, to have a constant diameter as well as constant distances to each other, thereby reducing the manufacturing costs.

Additionally, a nose region of the flow body 110 may comprise a stiffening profile 124, such as a U-profile, wherein further perforation holes are arranged in the suction skin 16 between the stiffening profile 124 and the second spar member 104, wherein the intermediate space between the stiffening profile 124 and the second spar member 104 may comprise further connection holes 126 as a second perforation for providing a fluid connection to the suction duct 117.

The inner flanges 112 and 114 may be attached to the outer skin 16 through a diffusion bonding process, which would result in a clearly simplified setup.

It should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A flow body comprising:
   a curved suction skin in form of a flat sheet metal plate bent to a profiled contour shape having a leading edge, a nose region around the leading edge and two skin sections extending from the nose region, wherein each skin section has an outer end facing away from the leading edge and an exterior perforated area formed in the respective skin section,
   a first spar,
   an interior suction duct having an interior perforated area and extending through an inside of the curved suction skin at a distance from the leading edge, and
   two sidewall members, connected to the outer ends of the skin sections, wherein the sidewall members are made of a composite material,
   wherein the first spar is arranged at the inside of the suction skin and is connected to the suction skin at the outer ends,
   wherein the interior suction duct is arranged between the first spar and the leading edge,
   wherein the profiled contour shape is configured with a nose region radius such that the nose region joins the skin sections, the skin sections join the sidewall members, and the sidewall members join a part following on from the sidewall members to a trailing edge of the flow body such that the nose radius runs into a trailing contour downstream of the sidewall members for generating a pressure distribution over at least one of the two skin sections when air flows over the curved suction skin,
   wherein the pressure distribution comprises a stagnation point, a suction peak and a local pressure maximum downstream of the suction peak and upstream of the trailing edge of the flow body, and
   wherein the exterior perforated area exclusively extends from the stagnation point to the local pressure maximum on the curved suction skin along the first 10% of the length of the chord of the flow body forward of the sidewall members and no suction element for suction of air through the sidewall members.

2. The flow body of claim 1, wherein the sidewall members are made of a sandwich material having at least one core layer enclosed between cover layers.

3. The flow body of claim 1, wherein the interior suction duct is created by an interior wall arrangement fixed to an inside of the curved suction skin, the interior wall arrangement comprising:
   a first interior sidewall connected to the first end of the suction skin,
   a second interior sidewall connected to the second end of the suction skin,
   wherein the first spar is connected to the first and second interior sidewalls at the first and second ends of the suction skin,
   a second spar connected to the first and second interior sidewalls at an end opposite to the first and second ends of the suction skin, such that a closed, quadrilateral cross-sectional suction duct surface is created by the first spar, the first interior sidewall, the second spar and the second interior sidewall member, and
   wherein the quadrilateral cross-sectional suction duct surface extends at a distance along the leading edge.

4. The flow body of claim 3, further comprising at least one stringer arranged between at least one of the first interior sidewall, the second interior sidewall and the suction skin, and wherein the at least one stringer extends along the leading edge in a distance thereto.

5. The flow body of claim 4, wherein the extension of the at least one stringer is interrupted along the leading edge.

6. The flow body of claim 1, further comprising a plurality of ribs at a distance to each other and arranged along the inside of the suction skin,
   wherein the ribs each comprise a cutout, and
   wherein the suction duct is tubular and extends through the cutouts of the ribs.

7. The flow body of claim 1, further comprising a plurality of ribs at a distance to each other and arranged along the inside of the suction skin, a first spar member and a second spar member, wherein the suction duct is created between the suction skin, the first spar member and the second spar member.

8. The flow body of claim 1, further comprising at least one inner spar delimiting the interior suction duct.

9. The flow body of claim 1, wherein the two sidewall members are non-perforated.

10. A method for manufacturing a flow body, comprising:
    forming a curved suction skin by bending a flat sheet metal plate to a profiled contour shape having a leading edge, a nose region around the leading edge and two skin sections extending from the nose region, wherein each skin section has an outer end facing away from the leading edge,
    connecting two sidewall members made of a composite material to the outer ends of the skin sections, such that the profiled contour shape of the suction skin is configured with a nose region radius such that the nose region joins the skin sections, the skin sections join the sidewall members, and the sidewall members join a part following on from the sidewall members to a trailing edge of the flow body such that the nose radius runs into a trailing contour downstream of the sidewall members for generating a pressure distribution over at least one of the two skin sections when air flows over the curved suction skin, which pressure distribution comprises a stagnation point, a suction peak and a local pressure maximum downstream of the suction peak and upstream of the trailing edge of the flow body,
    creating a first spar at the inside of the suction skin and in connection to the suction skin at the outer ends,
    creating an exterior perforated area exclusively extending from the stagnation point to the local pressure maximum on the curved suction skin along the first 10% of the length of the chord of the flow body forward of the sidewall members and no suction element for suction of air through the sidewall members, and providing an interior suction duct between the first spar and the leading edge, the interior suction duct having an interior perforated area and extending through an inside of the curved suction skin in a distance from the leading edge.

11. The method of claim 10, wherein forming the curved suction skin comprises a Super Plastic Forming (SPF) process of a titanium work piece.

12. The method of claim 11, wherein forming the curved suction skin comprises integrating a plurality of stiffening components at the inside of the suction skin through the SPF process.

13. The method of claim 12, further comprising brazing ribs to the inside of the suction skin.

14. A flow body comprising:
   a curved suction skin in form of a flat sheet metal plate bent to a profiled contour shape having a leading edge, a nose region around the leading edge and two skin sections extending from the nose region, wherein each skin section has an outer end facing away from the leading edge and an exterior perforated area formed in the respective skin section,
   a first spar,
   an interior suction duct having an interior perforated area and extending through an inside of the curved suction skin at a distance from the leading edge, and
   two sidewall members, connected to the outer ends of the skin sections, wherein the sidewall members are made of composite material,
   wherein the first spar is arranged at the inside of the suction skin and is connected to the suction skin at the outer ends,
   wherein the interior suction duct is arranged between the first spar and the leading edge,
   a plurality of ribs at a distance to each other and arranged along the inside of the suction skin, a first spar member and a second spar member,
   wherein the profiled contour shape is configured with a nose region radius such that the nose region joins the skin sections, the skin sections join the sidewall members, and the sidewall members join a part following on from the sidewall members to a trailing edge of the flow body such that the nose radius runs into a trailing contour downstream of the sidewall members for generating a pressure distribution over at least one of the two skin sections when air flows over the curved suction skin,
   wherein the pressure distribution comprises a stagnation point, a suction peak and a local pressure maximum downstream of the suction peak and upstream the trailing edge of the flow body,
   wherein the exterior perforated area exclusively extends from the stagnation point to the local pressure maximum on the curved suction skin along the first 10% of the length of the chord of the flow body forward of the sidewall members and no suction element for suction of air through the sidewall members, and
   wherein the suction duct is created between the suction skin, the first spar member and the second spar member.

* * * * *